United States Patent Office 3,408,314
Patented Oct. 29, 1968

3,408,314
DIGLYCIDYL ETHERS OF POLY(TETRAHYDRO-FURAN) PROCESS OF MAKING SAME AND POLYMERS THEREOF
Gene E. Schroll, Louisville, Ky., assignor to Celanese Coatings Company, New York, N.Y., a corporation of Delaware
No Drawing. Filed May 27, 1966, Ser. No. 553,282
7 Claims. (Cl. 260—2)

ABSTRACT OF THE DISCLOSURE

Diglycidyl ethers of poly(tetrahydrofuran) are prepared by first polymerizing epichlorohydrin, tetrahydrofuran and 3-chloro-1,2-propanediol to form a polymer of tetrahydrofuran containing chlorohydrin ether end groups, and then dehydrohalogenating the chlorohydrin groups to form the diglycidyl ether. These diglycidyl ethers when reacted with epoxide resin curing agents from thermoset resins useful, for example, as protective coatings, molding compounds and adhesives.

---

This invention relates to novel polymers of tetrahydrofuran containing glycidyl ether and groups. In another aspect, the invention pertains to a process for polymerizing tetrahydrofuran, epichlorohydrin and 3-chloro-1,2-propanediol to form a polymer containing chlorohydrin ether end groups and dehydrohalogenating the chlorohydrin groups to form a diepoxide compound.

Polymerization of tetrahydrofuran is known to produce 1,4 butylene oxide polymers. Such polymerization reaction are disclosed in High Polymers, vol. 13, "Polyethers," part I, entitled "Polyalkylene Oxides and Other Polyethers," N. G. Gaylord, Interscience Publishers, 1963. The polymers have various types of end groups depending upon the conditions of polymerizations.

The preparation of tetrahydrofuran polymers which have hydroxy end groups and are therefore poly (1,4-butylene glycols) is decribed in Industrial and Engineering Chemistry, vol. 52, p. 772 (1960). These polyglycols are made by the reaction of tetrahydrofuran with 5 mol percent ethylene glycol chain regulator and 4 mol percent ethylene oxide initiator using 1 mol percent boron trifluoride etherate as catalyst.

Various monoepoxides, including epichlorohydrin, have been used as initiators for the polymerization of tetrahydrofuran. Early work with these components is described in French Patent 898,269 which was published in 1945. This patent describes the initiation of the polymerization of tetrahydrofuran using a considerable number of active reagents in combination with Lewis acid catalysts. However, the polymers formed using epichlorohydrin as the initiator contain only one chlorohydrin end group and are thus monofunctional with respect to the chlorohydrin.

It has now been found that difunctional polymer i.e., a polymer terminated at both ends with a chlorohydrin ether group, can be prepared by reacting tetrahydrofuran with epichlorohydrin and 3-chloro-1,2-propanediol. This polymer can then be dehydrohalogenated to form a diglycidyl ether which has utility in thermoset resin applications. Diepoxide compositions are made which are linear polymers having the recurring units (A)  [—CH₂CH₂CH₂CH₂—O—]
and
(B)  [—CH₂CH—O—]
          |
          CH₂Cl randomly distributed in the polymer chain and the end groups (C) 

The number of (A) units in the polymer will vary from 5 to 30, the number of (B) units will be from 0 to 10,, the number of (C) units will be 2 and A+B will be from 5 to about 40. Polymers can be made having molecular weights of about 475 to about 3200 depending upon the ratio of reactants, the catalyst concentration and processing variables.

In carrying out the process of this invention, tetrahydrofuran, epichlorohydrin and 3-chloro-1,2-propanediol are reacted in a ratio of about 5 to 40 mols of tetrahydrofuran to about 2 to 1 mols of epichlorohydrin to about 1 mol of 3-chloro-1,2-propanediol with a Lewis acid catalyst to form a polymer containing chlorohydrin ether end groups. Subsequent dehydrohalogenation produces the diglycidyl ether.

The molecular weight of the polymeric product is dependent upon the mol ratio of tetrahydrofuran to initiator and terminator, the higher the ratio of tetrahydrofuran to initiator and terminator, the higher the molecular weight of the polymer, other factors being equal. Polymers of increasing molecular weights can be made by increasing the mols of tetrahydrofuran to each mol of initiator and terminator over the range of about 5 to about 40. The preferred range of tetrahydrofuran is about 10 to about 25 mols per each mol of initiator and terminator.

The ratio of initiator to terminator can be varied to some extent depending upon the type of polymer desired. When the ratio is high, the polymeric chain will contain a considerable number of (B) units (as defined hereinbefore), along with the 1,4-butylene oxide (A) units. When the ratio is substantially unity, few (B) units will be present. It is preferred that the ratio of initiator to terminator not exceed 2 and more preferably that the ratio equal about 1.

The polymerization reaction is conducted at a temperature of —50° C. to about 80° C. using pressures where needed. However, in order to obtain a desirable reaction rate as well as a good yield product, it is preferred to carry out the polymerization at temperatures of about —20° C. to 20° C. Temperatures within this latter range maximize the net chain growth rate, favor a high molecular weight product, and minimize the chlorine content of the final resin.

Catalysts for the polymerization reaction are Lewis acid type catalysts. Suitable catalysts include boron trifluoride and boron trifluoride complexes such as the complexes with diethyl ether and tetrahydrofuran. Additional catalysts are stannic chloride, antimony pentachloride, aluminum chloride, ferric chloride, zirconium tetrachloride and the like. The preferred catalyst is boron trifluoride. The catalysts for the polymerization reaction are used in catalytic amounts in the range of about 0.5 to about 2 mole percent based on the mols of tetrahydrofuran.

The polymerization reactions are conducted under substantially anhydrous conditions, i.e., the amount of water present, in mols, should be less than the mols of catalyst used. Water reacts with the catalyst forming a hydrate which has a diminished ability to catalyze the polymerization.

Tetrahydrofuran polymerization is a reversible reaction and it has been established that the equilibrium concentration of tetrahydrofuran is 2.8 mol/liter at 20° C. The forward reaction rate to the soluble polymer depends upon the concentration of tetrahydrofuran as well as the temperature, while the reverse reaction rate depends only on the temperature. In view of this equilibrium reaction, the conversion of tetrahydrofuran to polymer per run is limited to about 50 to about 80%. The unpolymerized tetrahydrofuran can be recovered for subsequent reactions.

The polymerization reaction is normally carried out without using a solvent. Solvents, which have no active hydrogen atoms or groups which interfere with the polymerization reaction, can be used to advantage in some instances. Examples of such solvents are 1,2-dichloroethane, methylene dichloride, diethyl ether, dibutyl ether, etc.

The dehydrohalogenation of the chlorohydrin terminated polymers is conducted using an alkaline compound by well known procedures as described in U.S. Patents, 2,538,072; 2,581,464 and 3,033,803. Suitable alkaline compounds are sodium hydroxide, potassium hydroxide, sodium silicate, potassium silicate, sodium aluminate, potassium zincate, sodium carbonate, calcium hydroxide and the like. The dehydrohalogenation can be carried out in an aqueous or non-aqueous medium, in a polar solvent, such as acetone, methyl ethyl ketone or methyl isobutyl ketone, in a non-polar medium such as benzene, xylene or toluene, or in a reactive solvent such as epichlorohydrin. The temperature for the dehydrohalogenation can be varied over the range of about 20° C. to about 150° C. depending to some extent upon the type dehydohalogenation agent or the solvent system used. After the dehydrohalogenation is completed, the polymeric diglycidyl ether is isolated by removal of the solvents and salts after neutralization of unreacted alkaline compound if present.

The polymeric diglycidyl ethers can be reacted with any of the well known epoxide resin curing agents to produce thermoset resins for various applications, such as protective coatings, molded compounds, adhesives and in encapsulating and potting applications. The compounds of this invention can be used alone with the curing agents or can be blended with other epoxide resins prior to the curing reaction.

Polymeric digylcidyl ethers of particular usefulness when blended with epoxide resins derived from dihydric phenols have epoxide equivalent weights of about 400 to about 600, chlorine contents of about 1 to 1.5 weight percent, and viscosities at 25° C. of about 400 to about 750 cps.

The invention can be better understood by reference to the following examples. Parts, where used, are parts by weight.

Example 1

To a suitable reaction flask equipped with a mechanical stirrer, reflux condenser, thermometer and nitrogen inlet tube were added 88 parts (1.22 mols) of tetrahydrofuran, 14 parts (0.127 mol) of 3-chloro-1,2-propanediol and 11.7 parts (0.127 mol) of epichlorohydrin. The reactants were cooled to 0° C., nitrogen was introduced into the flask, and 3.4 parts of $BF_3$ etherate (0.02 mol $BF_3$) were added. The temperature of the reactants rose to 7° C. due to the exothermic reaction. When the exothermic reaction was over, the flask contents were held at 2° C. for 16 hours to complete the polymerization.

To the reactants, at a temperature of 6° C. were added 1 part of water and 3 parts of sodium hydroxide. The temperature gradually rose to 23° C. within 21 minutes, after which time 3 parts of sodium hydroxide were added. Twenty-four minutes later and at 30° C., 3 parts of sodium hydroxide were added. After fifteen minutes, the temperature had risen to 35° C., 44 parts of benzene were added and heat was applied raising the temperature to 74° C. After thirty minutes' heating, the flask contents were cooled to room temperature and were neutralized with 2 N sulfuric acid.

The flask contents were poured into a separatory funnel where 2 layers formed. The lower (aqueous) layer was drawn off and the upper layer was washed with 50 parts of water. After drawing off the water, the upper layer was introduced into a distillation flask and was heated to 125° C. under 2 mm. Hg pressure to remove volatiles. The undistilled product was recovered in 62% yield, based on the starting tetrahydrofuran, (71.7 parts) and had an epoxide equivalent weight of 685.

Example 2

Using the same equipment as described in Example 1, 88 parts of tetrahydrofuran and 3.4 parts of $BF_3$ etherate were added to the flask. The flask contents were cooled to 1° C., and 14 parts of 3-chloro-1,2-propanediol were added. No exotherm was noted during this addition. Epichlorohydrin, 11.7 parts. was then added over a nine-minute period with the temperature rising to 5° C. followed by the addition of 8.8 parts of tetrahydrofuran. The reactants were then held at 2° C. for sixteen hours.

Dehydrohalogenation was conducted using 10 parts of sodium hydroxide added in three increments followed by recovery of the product using the procedures described in Example 1. The recovered product (74.5 parts had an epoxide equivalent weight of 588.

Example 3

Using the same procedure as described in Example 2, 83.6 parts of tetrahydrofuran, 14 parts of 3-chloro-1,2-propanediol and 1.7 parts of $BF_3$ etherate were mixed at 1° C. Epichlorohydrin (5.85 parts) was added slowly over a period of fifty minutes followed by the addition of 4.4 parts of tetrahydrofuran. The reactants were held at 1° C.–2° C. for sixteen hours, and the product, 33.5 parts, was recovered after dehydrohalogenation with 9 parts of sodium hydroxide and separation as described in Example 1. The product had an epoxide equivalent weight of 405.

Example 4

A suitable reaction flask was equipped with a mechanical stirrer, thermometer and dropping funnel. To the dropping funnel were added 704 parts of tetrahydrofuran, 56 parts of 3-chloro-1,2-propanediol and 46.8 parts of epichlorohydrin. The flask was cooled to 3° C. and 1.7 parts of $BF_3$ etherate were added. The reactants in the dropping funnel were added slowly to the flask while holding the temperature at 3° C. After ⅕ of the dropping funnel charge (1 hour and 50 minutes addition time) had been introduced into the flask, 1.7 parts of $BF_3$ etherate were added. Addition of the dropping funnel charge was continued for 4 hours and 11 minutes with the addition of 1.7 parts of $BF_3$ etherate after ⅖, ⅗ and ⅘ of the charge had been introduced into the flask. After all the reactants had been added, the flask contents were held at 3° C. for 16 hours.

Water, 8 parts, was added to the flask and the reactants were dehydrohalogenated with 56 parts of sodium hydroxide added in 5 equal increments over a 2-hour period. The temperature during this time rose from 2° C. to 35° C. Benzene, 350 parts, was added to the flask and heating at 76° C. was conducted for 30 minutes. The flask contents were cooled to room temperature and were neutralized with 2 N sulfuric acid. The flask contents were placed in a separatory funnel, the lower layer (aqueous) was drawn off and the upper layer was washed 3 times with 100 parts of distilled water, drawing off the water layer after each washing step. The product was isolated by distilling off the volatiles to a pot temperature of 140° C. under 5 mm. Hg pressure. 393.5 parts of product having an epoxide equivalent weight of 585 were recovered.

This example was repeated producing 397.8 parts of glycidyl ether having an epoxide equivalent weight of 586.

The two products were blended. The analysis of the blend was:

| | |
|---|---|
| Viscosity at 25° C. _____cps. | 470 |
| Color (Gardner) | <1 |
| Epoxide equivalent weight | 585 |
| Total chlorine _____percent | 1.39 |
| Hydrolyzable chlorine _____do | 0.08 |
| Weight/gallon _____lbs | 8.38 |

Example 5

Twenty-five parts of the glycidyl ether blend described in Example 4 were blended with 75 parts of the diglycidyl ether of bis(4-hydroxyphenyl)dimethylmethane having an epoxide equivalent weight of 190 and a viscosity at 25° C. of 12,000 cps. The resulting composition had a viscosity at 25° C. of 2,190 cps. In this composition, 67.5 parts of hexahydrophthalic anhydride and 0.75 part of diethylamino ethanol were dissolved. The solution was poured into a mold and was heated for 2 hours at 200° F. plus 2 hours at 400° F. The resulting cured castings had the following properties:

| | |
|---|---|
| Hardness (Shore D) | 84. |
| Tensile strength | 8,820 p.s.i. |
| Tensile elongation at 25° C. | 6 percent. |
| Flexural strength | 15,020 p.s.i. |
| Izod impact | 0.54 ft. lbs./inch notch. |

A 50/50 weight blend of the two epoxide compounds had a viscosity of 950 cps. When cured with 53.7 parts of hexahydrophthalic anhydride and 0.75 part of diethylamino ethanol using the same cure schedule as described above, the properties were:

| | |
|---|---|
| Hardness (Shore D) | 71. |
| Tensile strength | 3,450 p.s.i. |
| Tensile elongation at 25° C. | 38 percent. |
| Flexural strength | 5,480 p.s.i. |
| Izod impact | 0.75 ft. lbs./inch notch. |

Example 6

Using the same procedure as described in Example 4, 176 parts of tetrahydrofuran were reacted with 14 parts of 3-chloro-1,2-propanediol and 11.7 parts of epichlorohydrin using 1.7 parts of antimony pentachloride in 14 parts of diethyl ether as catalyst. After dehydrohalogenation with sodium hydroxide, 107 parts of product were recovered having an epoxide equivalent weight of 884.

Similar results were obtained when stannic chloride was substituted as the catalyst in the above reaction.

It is to be understood that the foregoing detailed description is given merely by way of illustration and that many variations may be made therein without departing from the spirit of the invention.

The embodiments of the invention in which an exclusive property or privilege is claimed are defined as follows:

1. A process for preparing diglycidyl ethers which comprises
   (A) polymerizing tetrahydrofuran, epichlorohydrin and 3 - chloro - 1,2 - propanediol in a ratio of about 5 to 40 mols of tetrahydrofuran to about 2 to 1 mols of epichlorohydrin to 1 mol of 3 - chloro-1,2-propanediol with about 0.5 to about 2 mol percent based on the mols of tetrahydrofuran of a Lewis acid catalyst in the substantial absence of water at a temperature of —50° C. to about 80° C., wherein the epichlorohydrin is the initiator and the 3 - chloro-1,2-propanediol is the terminator of the polymerization reaction to form poly(1,4 - butylene oxide) having chlorohydrin ether end groups, and
   (B) dehydrohalogenating the chlorohydrin ether groups with an alkaline compound at a temperature of about 20° C. to about 150° C. to form the diglycidyl ether.

2. The process of claim 1 wherein the catalyst is boron trifluoride etherate.

3. The process of claim 1 wherein the ratio of reactants are 10 to 25 mols of tetrahydrofuran to 1 mol of epichlorohydrin to 1 mol of 3-chloro-1,2-propanediol.

4. The process of claim 1 wherein the polymerization is conducted at a temperature of —20° C. to 20° C.

5. The process of claim 1 wherein the alkaline compound is sodium hydroxide.

6. A composition which comprises a linear polymer having the recurring units (A) 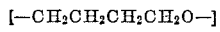

and (B) 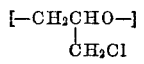

randomly distributed throughout the polymer chain and the end groups (C) 

wherein the number of units of (A) are from 5 to about 30, the number of units of (B) are from 0 to about 10 and the number of units of (C) are 2, said composition having a molecular weight of about 475 to about 3200.

7. The composition of claim 6 having an epoxide equivalent weight of 400 to about 600, a chlorine content of 1 to about 1.5 weight percent and a viscosity at 25° C. of about 400 to about 750 cps.

References Cited

FOREIGN PATENTS 917,951   2/1963   Great Britain.

WILLIAM H. SHORT, *Primary Examiner.*

T. E. PERTILLA, *Assistant Examiner.*